United States Patent [19]
Leingang

[11] 3,901,028
[45] Aug. 26, 1975

[54] RAMJET WITH INTEGRATED ROCKET BOOST MOTOR
[75] Inventor: John L. Leingang, Dayton, Ohio
[73] Assignee: The United States of America as represented by the Secretary of the Air Force, Washington, D.C.
[22] Filed: May 21, 1974
[21] Appl. No.: 471,930

Related U.S. Application Data
[63] Continuation-in-part of Ser. No. 288,816, Sept. 13, 1972, abandoned.

[52] U.S. Cl. .................. 60/225; 60/245; 60/263; 60/270 R
[51] Int. Cl. ............ F02k 7/10; F02k 9/04
[58] Field of Search........... 60/225, 245, 263, 270 R, 60/270 S, 39.33; 102/49.3

[56] References Cited
UNITED STATES PATENTS
2,644,396  7/1953  Billman .................. 60/225
3,045,517  6/1962  Ryden et al. ............ 60/270 S
3,063,240  11/1962  Ledwith ................. 60/225
3,086,359  4/1963  Davis ................... 60/225
3,279,187  10/1966  Lindman ................ 60/245
3,316,716  5/1967  Escher .................. 60/225
3,336,753  8/1967  Mullen et al. ........... 60/225
3,724,216  4/1973  Smith ................... 60/270 S Primary Examiner—C. J. Husar
Assistant Examiner—Robert E. Garrett
Attorney, Agent, or Firm—Joseph E. Rusz; Richard J. Killoren

[57] ABSTRACT

A combination rocket motor ramjet engine having the rocket motor located in the ramjet inlet diffuser. All or part of the rocket portion of the apparatus remaining after rocket booster burnout are ejected by air pressure in the diffuser inlet to permit the diffuser to supply ram air for the ramjet engine.

3 Claims, 8 Drawing Figures

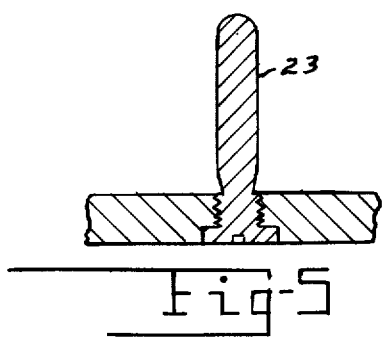
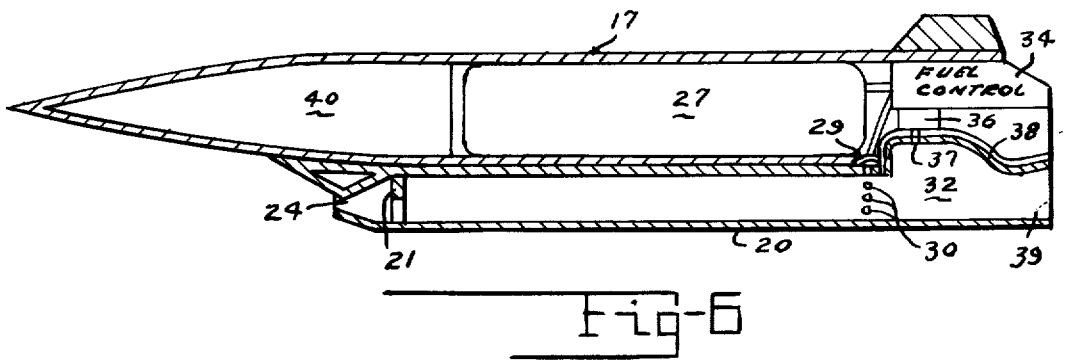
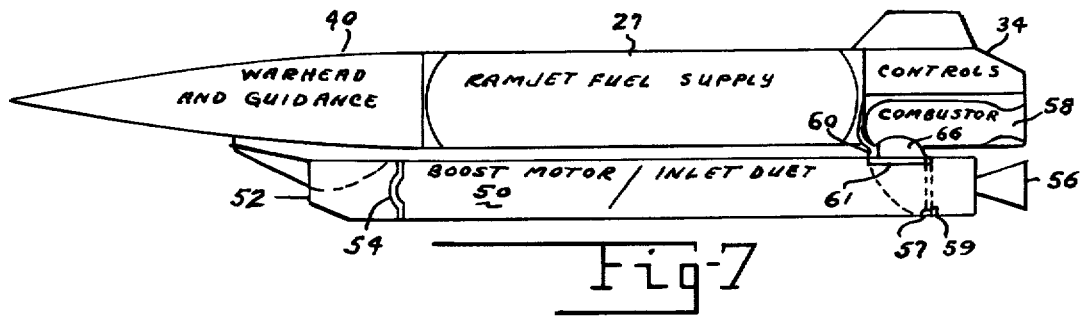
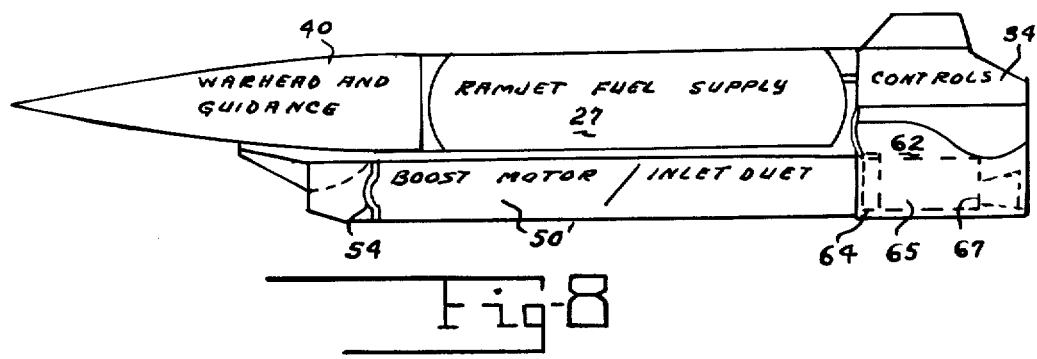

3,901,028

RAMJET WITH INTEGRATED ROCKET BOOST MOTOR

RIGHTS OF THE GOVERNMENT

The invention described herein may be manufactured and used by or for the Government of the United States for all governmental purposes without the payment of any royalty.

CROSS REFERENCE TO RELATED APPLICATION

This is a continuation-in-part of application Ser. No. 288,816, filed Sept. 13, 1972, now abandoned.

BACKGROUND OF THE INVENTION

Various arrangements have been used in combination rocket-ramjet engines. In prior art integral rocket-ramjet engines, the boost propellant is structurally and functionally integrated with the ramjet combustor as in the Patent to Schubert, No. 3,535,881. In other systems, rocket engines are specially designed to fit in the combustor portion of the ramjet engine. For some applications for combination rocket motor ramjet engines, compact construction is desirable. One such combination rocket motor ramjet engine of compact construction is the type which uses a long inlet diffuser duct extending along the side of the missile to supply air to a sudden expansion or dump type combustor positioned aft of the missile. In these combustors, the rocket boost propellant is located in the combustor. After rocket motor burnout, the apparatus converts to ramjet operation. Fuel is supplied just upstream of the sudden expansion region and a wake region is formed just downstream of the sudden expansion to provide rapid mixing and intense combustion in a short length which permits a compact packaging system.

BRIEF SUMMARY OF THE INVENTION

In the combination rocket motor ramjet engine using the dump type combustor, the elongated inlet duct is unused during the rocket phase of the operation. According to this invention, the ramjet inlet diffuser for a sudden expansion type combination rocket motor ramjet engine is designed to contain the rocket boost motor. All or part of the rocket motor apparatus is ejected after rocket motor burnout to permit the inlet diffuser to be used to provide ram air for the ramjet combustor.

IN THE DRAWINGS

FIG. 1 of the drawing shows a prior art combination rocket motor ramjet engine with a dump type combustor for the ramjet engine.

FIG. 5, shows a schematic sectional view of one type of retainer pin for use in the device of FIG. 2.

FIG. 6 is a partially schematic sectional view of the device of FIG. 2 with the rocket boost motor removed.

FIG. 7 is a schematic view of another embodiment of the invention.

FIG. 8 is a schematic view of a further embodiment of the invention.

DETAILED DESCRIPTION OF THE INVENTION

Figure 1:
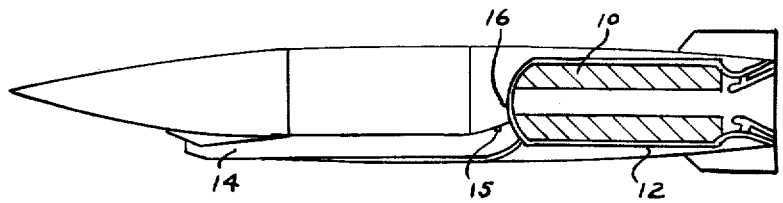
Figure 2:
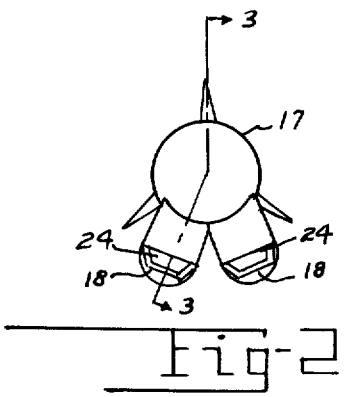
FIG. 2 is a front end view of a combination rocket-ramjet boost motor according to the invention.
Figure 3:
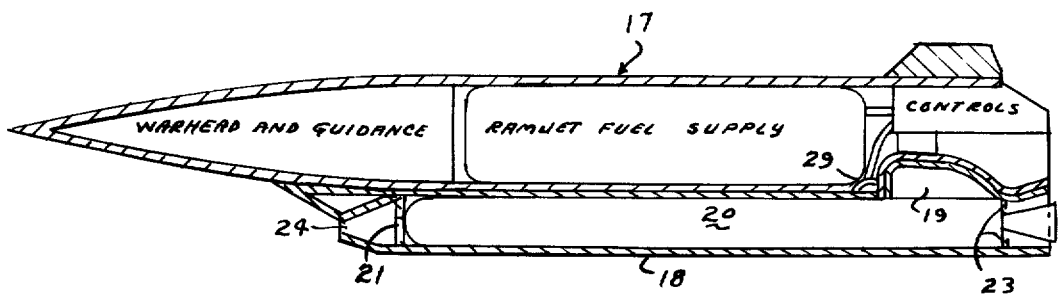
FIG. 3 is a partially schematic sectional view of the device of FIG. 2 along the line 3—3.
Figure 4:
FIG. 4 is an end view of a thrust frame for the device of FIG. 2.

Reference is now made to FIG. 1 of the drawing which shows a prior art combination rocket motor ramjet engine wherein a rocket motor boost fuel grain 10 is positioned within the combustion 12. Ram air is supplied to the combustor through an inlet diffuser duct 14. Fuel is supplied to the combustor at 15 just upstream of the sudden expansion region 16. The ramjet fuel is normally ignited with a pyrophonic material. In the device of this invention, an integrated boost motor missile 17 is provided with two inlet diffusers 18 for conventional dump type ramjet combustors 19, one of which is shown in FIG. 2, each containing a conventional rocket boost motor 20. The inlet diffusers 18 are designed to hold the rocket motors 20. Each diffuser has a thrust frame 21 secured to the inlet diffuser body in front of rocket motors 20 to take the thrust load. The frames 21 have openings 22, as shown in FIG. 4, to permit air flow to the ramjets 19 after rocket motors 20 are removed from the inlet diffusers 18. The rocket motors 20 are retained in the diffusers by means of break pins 23 of a material such as stainless steel which are threaded into the nozzle wall as shown in FIG. 5. These pins are made strong enough to retain the rocket motors within the diffuser housings during normal handling. During operation of the thrust motors 20, the rocket force is against the thrust frames 21 and the pins 23 take no load. When the rocket motors shut down at about Mach 2, the blast pressure against the front of the rockets in the diffuser inlets 24 breaks the pins 23 and ejects the rocket motor casings from the diffuser chambers.

The ramjet configuration is then as shown in FIG. 6. The ramjet operation is started by supplying fuel from fuel supply 27 to manifold 29 and through holes 30 into chamber 32 through a conventional fuel control 34. The ramjet fuel is ignited in a conventional manner, for example by means of a pyrophoric material, such as tiethylboron, from pressure, bottle 36 supplied to the combustion chamber through inlets 37. The device then operates as a conventional dump type combustor to provide a thrust from nozzle 39. A layer of thermal insulation 38 such as silica phenolic or silicone rubber, is provided on the wall of the ramjet combustion chamber. A conventional warhead and guidance system, shown schematically at 40, is positioned forward of the fuel supply 27.

In the operation of the apparatus, initially the rocket boost motor which may be of current conventional design is ignited in the conventional manner to launch and boost the missile 17. At about Mach-2, or any other design speed, when the boost rockets 20 burn out, the blast air pressure in inlets 24 breaks pins 23 and ejects the rocket motor casings from the inlet diffusers 18. The fuel control then supplies fuel to the combustion chambers through holes 30. The fuel control also supplies pyrophoric material through inlets 37 to ignite the fuel so that the apparatus continues operation as a conventional dump type ramjet engine.

While the device described makes use of a conventional rocket boost motor, the device may be modified, as shown in FIG. 7, with a separate boost chamber formed as a diffuser inlet for a separate ramjet combustor.

In this device, the rocket propellant is located in a rocket casing 50 with the front end 52 designed as a diffuser inlet. A frangible boost motor dome 54 is secured in the front end of the casing 50. The dome may be a serrated glass plate which is shattered by blast air and which passes out through the outlet nozzle 56 after rocket burnout. Other means could be provided for shattering the dome 54, such as an explosive charge or a spring loaded striker.

The closure member 61 is then blown from the position shown to a position against a stop 59 by means of conventional explosive release mechanism 60 to open a passage 66 into combustor chamber 58 for ram air and to seal nozzle 56. A latch 57, in the form of an interference fit, may be provided adjacent stop 59.

After the nozzle 56 is sealed, air from the inlet diffuser passes into a conventional ramjet combustor 58 which is started in a conventional manner and operation as a ramjet continues as described above.

The device of FIG. 7 can be modified for use with the ramjet combustor of FIG. 6, as shown in FIG. 8. In this device, the rocket boost motor is the same as in FIG. 7, but has an ejectable rear portion 65 of the motor casing 50' located in the ramjet combustor chamber 62. In this device, a release mechanism 64 is operated upon burnout by a signal from the fuel control and blast air against wall 67 ejects the motor casing portion 65 from the combustor chamber. The mechanism 64 may be a conventional flange joint held together with explosive bolts. The ramjet is then operated as in the device of FIG. 6.

There is thus provided a combination rocket and ramjet engine with increased packaging efficiency over prior art devices.

I claim:

1. A combination rocket-ramjet booster, comprising: a missile housing inclosing a payload; at least one dump type ramjet combustor attached to the aft end of said missile housing and having a portion extending into the aft portion of the missile body to form a sudden expansion region; an elongated inlet diffuser duct attached to and extending forward of said combustor over one half the length of the missile housing for supplying ram air to said combustor; means, within said housing for supplying ramjet fuel to said combustor; means for igniting said ramjet fuel in said combustor; a rocket boost motor positioned within said combustor and the inlet diffuser duct; break away means responsive to ram air, in the diffuser inlet, for converting the inlet diffuser duct for ramjet operation after rocket motor burnout.

2. The device, as recited in claim 1, wherein said means for converting the inlet diffuser for ramjet operation includes a rocket motor casing within the combustor and inlet diffuser which is ejectable by ram air after rocket burnout; said rocket motor filling the diffuser cross section and having an exit nozzle positioned within the exhaust nozzle of the ramjet combustor; a thrust frame secured to the inlet diffuser for taking the thrust load of the rocket motor; said thrust frame being forward of and separate from said rocket motor; said breakaway means being a plurality of pins positioned adjacent the aft end of said rocket motor for retaining the rocket motor within the diffuser before launch and being breakable by blast air against the front end of the rocket motor, after rocket motor burnout, to permit ejection of the rocket motor and the conversion of the inlet diffuser duct for ramjet operation.

3. The device as recited in claim 1, wherein the means for converting the inlet diffuser for ramjet operation includes a rocket boost motor dome within the inlet diffuser for sealing the diffuser inlet during rocket boost operation and breakable by ram air upon rocket burnout and an ejectable rocket motor case portion in the ramjet chamber; means for releasing the rocket motor case portion after rocket motor burnout.

* * * * *